(12) United States Patent
Balogh et al.

(10) Patent No.: US 6,327,303 B1
(45) Date of Patent: Dec. 4, 2001

(54) METHOD AND SYSTEM FOR DATA TRANSMISSION USING A LOSSY COMPRESSION SERVICE

(75) Inventors: Craig Robert Balogh, Mesa; William Chun-Hung Yip, Phoenix; Timothy Gerard Hall, Mesa, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/124,785

(22) Filed: Jul. 30, 1998

(51) Int. Cl.[7] ........................................................ H04B 1/66
(52) U.S. Cl. ................ 375/240; 375/240.11; 375/240.14; 375/240.15; 704/500; 704/503
(58) Field of Search ............................... 375/240, 240.11, 375/240.14, 240.15, 240.25, 240.26; 704/500, 503

(56) References Cited

U.S. PATENT DOCUMENTS

| | | | |
|---|---|---|---|
| 4,794,455 | * 12/1988 | Ericsson | 358/135 |
| 5,568,483 | * 10/1996 | Padovani et al. | 370/84 |
| 6,252,905 | * 6/2001 | Pokrinchak et al. | 375/240.14 |
| 6,266,368 | * 7/2001 | Bruekers | 375/240 |

* cited by examiner

*Primary Examiner*—Stephen Chin
*Assistant Examiner*—Dac V. Ha
(74) *Attorney, Agent, or Firm*—Gregory J. Gorrie (57) ABSTRACT

A system (20) transmits a digital data stream (22) using a lossy compression service (24) having a communication path (28) through which compressed signals propagate. The system includes a data conditioner (36) configured to condition the received digital data stream (22) to produce data subsets (66). A frame generator (36) expands each of the data subsets (66) to generate distinct signal sets (68). The distinct signal sets (68) are expressed in a data size greater than the data subsets (66) to compensate for lossy compression cause by the lossy compression service (24). A transmitter is in communication with the frame generator (36) and transmits digitized ones of the distinct signal sets (68) in frames of a digital bit stream (126) over the communication path (28).

27 Claims, 5 Drawing Sheets

METHOD AND SYSTEM FOR DATA TRANSMISSION USING A LOSSY COMPRESSION SERVICE

FIELD OF THE INVENTION

The present invention relates generally to communications systems and, in particular, to communications systems using lossy compression techniques to compress digital data streams.

BACKGROUND OF THE INVENTION

Commercial digital wireless systems employ methods which improve the performance of voice transmission and reception. These digital wireless systems serve to mitigate the major problems encountered by users of analog wireless systems such as static, loss/interruption of signal when passing between cells, and failure to get a connection because of congested relays. This is true for systems which are based on digital wireless standards such as Time Division Multiple Access (TDMA), Call Division Multiple Access (CDMA), Global System for Mobile Communications (GSM), Personal Communications Service (PCS), and so forth. Indeed, the majority of service providers of commercial digital wireless systems generate the bulk of their revenue from subscribers using the standard voice service provision.

However, in addition to voice communication, there is an increasing desire by service subscribers to send digital data, such as computer data, video data, facsimile (FAX), and so forth, using digital wireless services. Unfortunately, data and FAX transmission services are not always provided by the digital wireless service providers.

When data and FAX transmission services are offered by the digital wireless service providers, they generally require special interfaces to the subscriber equipment to be able to bypass the vocoders used for voice transmission. The special interfaces to subscriber equipment are not always consistent between service providers in various geographic regions. This inconsistency becomes a problem for subscribers of digital wireless services to be ensured data or FAX services in some geographic regions.

In addition, even when the vocoder system is bypassed, a re-transmit data transmission protocol may cause problems with transmission of "real-time" data. Real-time data is that data which is to be transmitted by the digital wireless service as rapidly as the data is being input into the system. A re-transmit protocol causes data to be re-transmitted by the transmitting end of the communication system when the data is not successfully received at the receiving end of the communication system. While a re-transmit protocol may work when transmitting buffered data files, the re-transmit protocol does not work effectively when transmitting real-time data because some subsequent real-time data may get discarded or delayed when performing the re-transmission operation.

Conventional digital wireless services generally employ vocoders for voice transmission and reception. A vocoder, or voice coder, usually consists of a speech analyzer (encoder) and a speech synthesizer (decoder). The encoder converts analog speech waveforms into digital signals for transmission over a communication path. The decoder converts the received digital signals into artificial (i.e. synthesized) speech waveforms. In addition, the vocoder may be used in conjunction with a key generator and an encryption device to transmit digitally encrypted speech signals over normal narrowband voice communications channels.

Since vocoders are used for voice communications in many conventional digital wireless services, it is desirable to use vocoders for data and FAX transmission as a means of providing data transmission without significantly altering the infrastructure of the digital wireless systems. Unfortunately, vocoders are designed convert analog speech waveforms, rather than the seemingly random bit patterns of a digital data stream. Since the data and fax bit patterns appear random to the vocoders and are not bandwidth limited to audio frequencies, the vocoders do not properly convert the bit patterns prior to transmission.

In general, vocoders employ lossy compression techniques to compress the digitized analog speech waveforms. In other words, a vocoder encoder converts the analog speech waveforms, collects the digitized linear audio (voice) samples, and then compresses the samples using an encoding algorithm. Lossy compression is employed by vocoders to reduce space, bandwidth, cost, and time for the generation, transmission, and storage of voice data by eliminating redundancy, removing irrelevancy, and using various forms of special coding. Thus, lossy compression reduces the amount of data used to represent a given amount of speech information. Rather, lossless compression increases the amount of data that can be stored in a given domain by employing such techniques as simply squeezing a given amount of data into a smaller space.

The vocoder decoder can synthesize the speech waveforms from the compressed data despite the loss of some of the informational content of the voice samples. However, the vocoder decoder does not precisely reconstruct the lost data. Although, lost data can be tolerated when synthesizing speech waveforms, lost data generally cannot be tolerated when transmitting digital data or FAX since every element, or bit, of data carries some meaning within the context of that digital data or FAX stream.

Moreover, vocoders are not compatible with the high data rates of digital data and FAX transmissions. In other words, if the conventional audio modem tone is used to transmit data through a vocoded channel, tremendous data rate reduction occurs compared to a wireline voice channel. The data rate reduction undesirably delays real-time data transmission, monopolizes the vocoder channel which drives up the "airtime" cost of data transmission, and prevents the channel's use for subsequent communications.

Thus, what is needed is a system and method that can be readily employed by service subscribers of digital wireless and other communications services that employ lossy compression techniques to provide data and FAX transmission services where only voice service may be offered. Furthermore, what is needed is a system and method that allows the service subscribers to utilize the standard digital wireless voice services or other lossy compression services to obtain data or FAX services without changes to the elements of the system infrastructure. In addition, what is needed is a system and method that provides reliable, real-time transfer of the data and FAX transmissions.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE DRAWINGS

Figure 1:
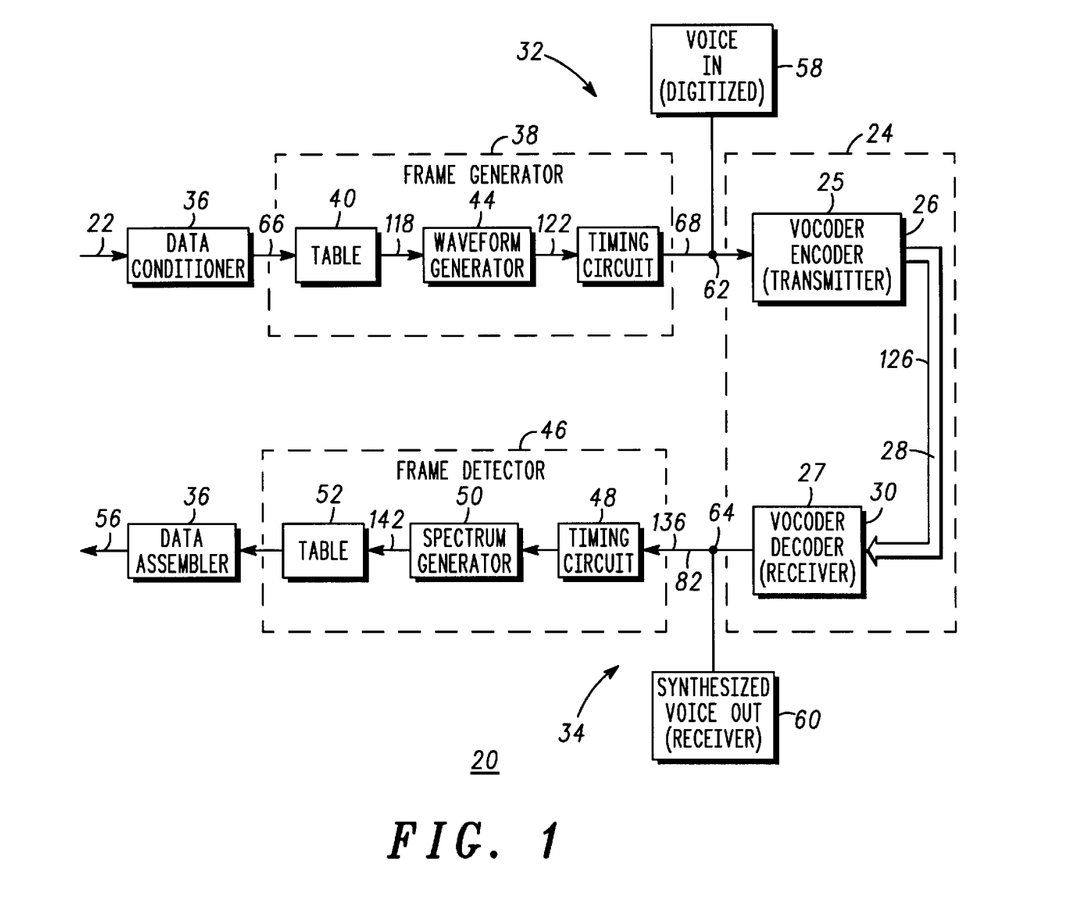
FIG. 1 shows a block diagram of a system for transmitting a digital data stream using a digital wireless voice service in accordance with a preferred embodiment of the present invention.

FIG. 1 shows a block diagram of a system 20 for transmitting a digital data stream 22 using a digital wireless voice service 24 in accordance with a preferred embodiment of the present invention. Digital data stream 22 may be computer generated digital data, digital video data, facsimile (FAX) data, cipher data, video, and so forth.

Digital wireless voice service 24 is a lossy compression service. In other words, a transmitter 25 of service 24 compresses the data in such a manner that some of the informational content of the data is lost. A receiver 27 of service 24 decompresses the data to form a synthesized replica of the compressed data containing the substance of, but not all of, the informational content of the original data. Service 24 may operate under any of a number of digital wireless standards, such as, Time Division Multiple Access (TDMA), Call Division Multiple Access (CDMA), Global System for Mobile Communications (GSM), Personal Communications Service (PCS), and so forth.

Digital wireless voice service 24 includes a vocoder encoder 26, a communication path 28, and a vocoder decoder 30. In the preferred embodiment service 24 is wireless, however, service 24 need not be wireless. Rather, wireless service 24 may be a wired system that employs vocoder systems and lossy compression techniques at transmit and receive ends of the lossy compression service.

Vocoder encoder 26 is a transmitter portion of digital wireless voice service 24, while vocoder decoder 30 is a receiver portion of digital wireless voice service 24. Communication path 28 represents a communication link between encoder 26 at a transmit end 32 of system 20 and decoder 30 at a receiving end 34 of system 20 along which compressed signals propagate. It should be readily apparent to those skilled in the art that transmit end 32 may include a decoder (not shown) and receiving end 34 may include an encoder (not shown) for bi-directional communication. In addition, those skilled in the art will recognize that communication path 28 may include the conventional elements of a wireless system, such as base stations and switching offices, as well as the wireline public switched telephone network (not shown) and will not be discussed in detail herein.

Transmit end 32 includes a data conditioner 36 configured to receive digital data stream 22. Data conditioner 36 has an output coupled to a frame generator 38. Frame generator 38 includes a table 40, a waveform generator 42, and a timing circuit 44. Table 40 is in communication with the output of data conditioner 36. In addition, an output of table 40 is in communication with waveform generator 42 which, in turn, is in communication with timing circuit 44. Timing circuit 44 of frame generator 38 has an output coupled to an input of vocoder encoder 26.

Receive end 34 includes a frame detector 46 in communication with an output of vocoder decoder 30. Frame detector 46 includes a timing circuit 48, a spectrum generator 50, and a table 52. Timing circuit 48 is in communication with the output of vocoder decoder 30. In addition, an output of timing circuit 48 is in communication with spectrum generator 50 which, in turn, is in communication with table 52. An output of table 52 is received by a data assembler 54. Data assembler 54 is configured to output a synthesized digital data stream 56.

Normal speech processing techniques encode voice signals from analog speech waveforms by recognizing speech sound attributes and converting them into digitally encoded components. These digitally encoded components are transferred through the system infrastructure and air interface to the listener for decoding. The decode process is a voice pattern re-creation or synthesis from the original components as captured at the transmitting end.

Per convention, encoder 26 is configured to receive digitized voice waveforms (VOICE IN) 58, and using lossy compression algorithms, encoder 26 compresses voice waveforms 58 for transmission as a compressed signal over communication path 28. Decoder 30 receives the compressed signal from communication path 28 and transforms it into digital synthesized voice waveforms (SYNTHESIZED VOICE OUT) 60.

In the preferred embodiment, encoder 26 is also configured to receive signals representing digital data stream 22 from frame generator 38, as represented by a first intersect 62, and transmit the signals as a compressed signal over communication path 28. Likewise, vocoder decoder 30 communicates the transmitted signals to frame detector 46, as represented by a second intersect 64 to synthesize signals representing synthesized digital data stream 56.

Data conditioner 36, frame generator 38, frame detector 46, and data assembler 54 may be incorporated into a modified commercial voice subscriber unit. Alternatively, data conditioner 36, frame generator 38, frame detector 46, and data assembler 54 may be configured as subscriber owned interface hardware containing a microprocessor and user specific software algorithms. The interface hardware would then access the audio path of a standard commercial subscriber unit at intersect 62 and intersect 64.

Generally, data conditioner 36 is configured to condition digital data stream 22 to produce a plurality of data subsets 66. Frame generator 38 then expands each of data subsets 66 by indexing table 40, to generate related distinct signal sets, or framed distinct digitized audio waveforms 68 that are compatible with encoder 26 and decoder 30 of service 24. Framed distinct digitized audio waveforms 68 representing data subsets 66 of digital data stream 22 are then successfully transferred as compressed signals through lossy compression digital wireless voice service 24. Distinct audio waveforms 68 are expressed in a data size greater than data subsets 66, i.e. expanded, to compensate for the lossy compression caused by vocoder encoder 26 of digital wireless voice service 24. Table 40 is initialized by relating potential data subsets to distinct audio waveforms 68 prior to activation of system 20.

Figure 2:
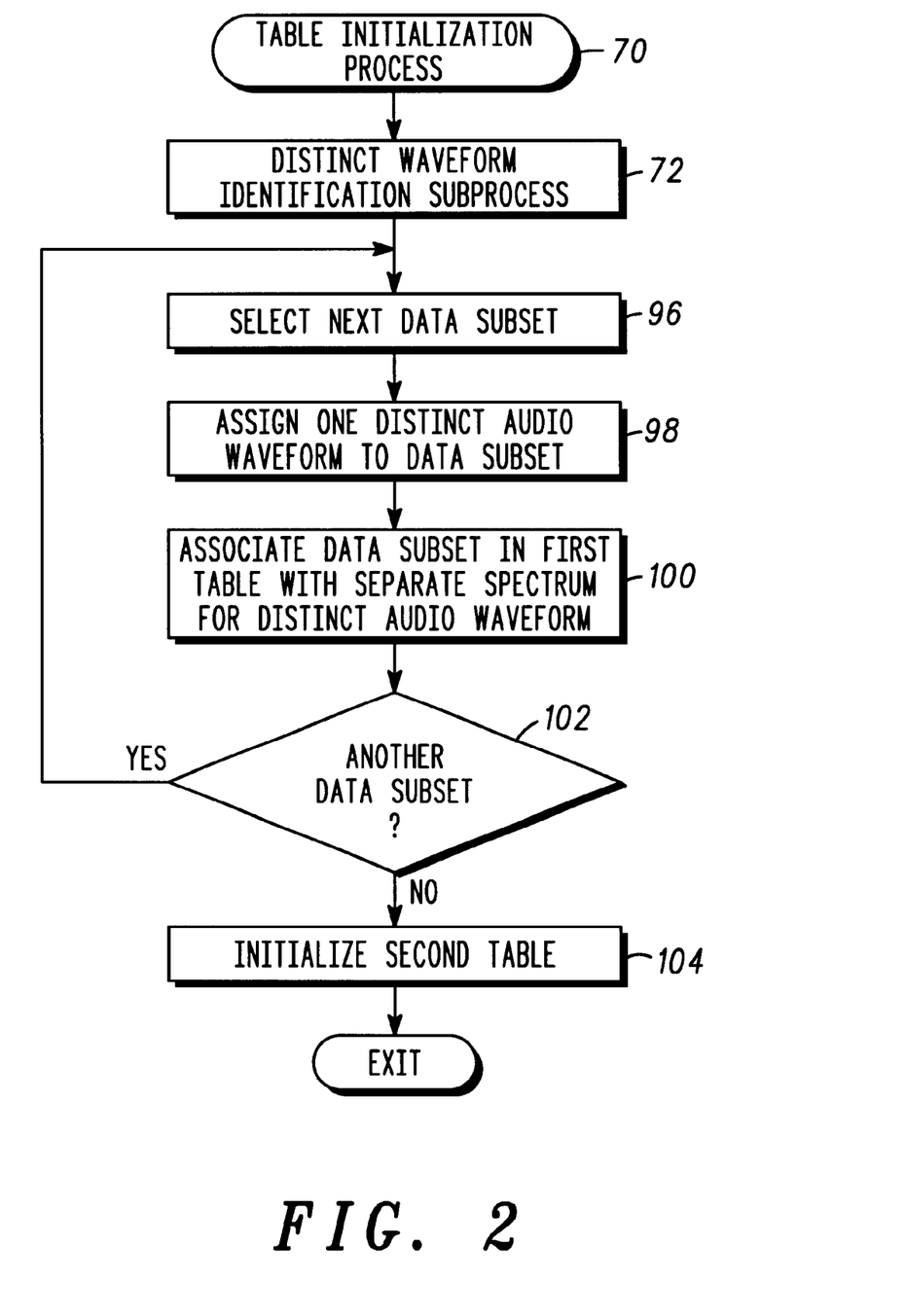
FIG. 2 shows a flowchart of a table initialization process in accordance with a preferred embodiment of the present invention.

FIG. 2 shows a flowchart of a table initialization process 70 in accordance with a preferred embodiment of the present invention. Process 70 is performed prior to transmission of digital data stream 22 using lossy compression digital wireless service 24. In general, table 40 includes a plurality of memory locations configured or arranged to associate one each of the potential data subset entries representative of one of data subsets 66 with one each of a plurality of separate signal-defining patterns, separate spectra. Each spectrum represents one each of distinct digitized audio waveforms 68. In the preferred embodiment, the spectrum is a frequency domain representation of the distinct audio waveform.

Figure 3:
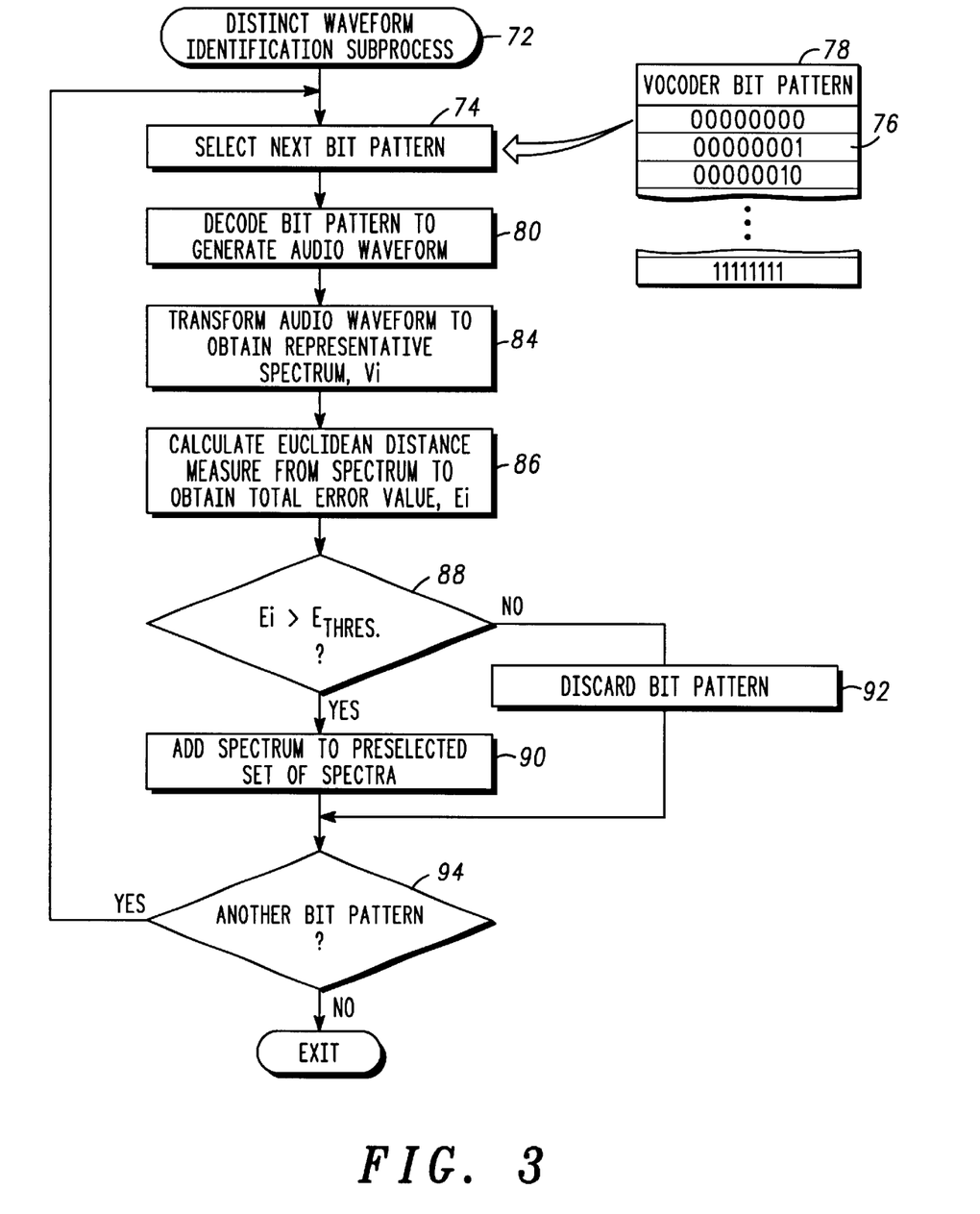
FIG. 3 shows a flowchart of a distinct waveform identification subprocess in accordance with a preferred embodiment of the present invention.

Table initialization process 70 begins by performing a distinct waveform identification subprocess 72. FIG. 3 shows a flowchart of distinct waveform identification subprocess 72 in accordance with a preferred embodiment of the present invention. Subprocess 72 identifies a plurality of distinct audio waveforms that are compatible with transmission over communication path 28 (FIG. 1). Compatible audio waveforms are those audio waveforms that digital wireless voice service 24 can recognize and convert to compressed signals for propagation through communication path 28. In addition, subprocess 72 identifies the distinct audio waveforms that are the most different from one another so that they are more easily distinguished from each other at receive end 34 (FIG. 1).

Subprocess 72 begins with a task 74. Task 74 causes a computer (not shown) to select a unique bit pattern 76 from a list of vocoder bit patterns 78. Unique bit pattern 76 may be selected by conventional bit selection algorithms such as by incrementing a counter. Unique bit patterns 76 exhibit a unique bit combination, and are fixed-size bit streams relative to a vocoder-defined frame of data. In other words, list 78 contains all combinations of bits for a predetermined frame size, the frame size being defined by the type of vocoder system used. List 78 need not actually be constructed if an algorithm is used to generate unique bit patterns 76. However, in an exemplary embodiment, list 78 is constructed to illustrate an eight bit frame of data, with unique bit pattern 76 being eight bits in length.

Following selection of vocoder bit pattern 76 in task 74, a task 80 decodes unique bit pattern 76 to generate a synthesized audio waveform. With reference to FIG. 1, vocoder bit pattern 76 is input into decoder 30 (or an equivalent off-line decoder 30 or simulator). Decoder 30 generates a digitized audio waveform 82 in response to unique bit pattern 76.

Following task 80, a task 84 is performed. Task 84 transforms audio waveform 82 to obtain a representative spectrum, or signal-defining pattern. In the preferred embodiment, the representative spectrum of audio waveform 82 is generated by using a Fast Fourier Transform function. Thus, the generated spectrum is a frequency domain signal-defining pattern representative of audio waveform 82.

Following task 84, a task 86 is performed to obtain a total error value, $E_i$, for the spectrum generated in task 84. In the preferred embodiment, the total error value, $E_i$, is obtained by calculating a Euclidean distance measure for the generated spectrum. The Euclidean distance measure is used in determining the "closeness" of two spectra. The Euclidean distance measure is expressed in mathematical terms as the total sum of squares of the difference of two N dimensional vectors, as represented by the following equation:

$$E_i = \frac{1}{M} \sum_{k=1}^{M} \left( \sum_{j=1}^{N} (V_i - V_j)^2 \right)$$

where:

M=distinct set of spectra
N=dimensional vector
$V_i$=Spectrum I
$V_j$=Spectrum J
$E_i$=Total error value In the preferred embodiment, each of the spectra, $V_i$ and $V_j$, is described by the N dimensional vector, where N is the number of frequency bins, of the frequency domain signal-defining pattern representing the spectrum. The total error value, $E_i$, describes the similarity of each amplitude at each frequency bin describing spectrum $V_i$, obtained in task 84 to each amplitude at each frequency bin describing spectrum $V_j$, of a preselected set of spectra, i.e. M distinct set of spectra.

In the preferred embodiment, the preselected set of spectra may begin as a set of unique spectra used by the vocoder system of digital wireless voice service 24 (FIG. 1) to distinguish one utterance from another. The Euclidean distance measure is then used to measure and select additional distinct or "different" spectra by changing one or more bits in a vocoder bit pattern, as illustrated in list 78, in order to increase the total number of separate distinguishable spectra representing distinct audio waveforms 68 in the preselected set of spectra. In an alternative embodiment, the preselected set of spectra may begin as a null set, and the Euclidean distance measure is used to select the entire set of "different" spectra.

Following task 86, a query task 88 is performed. Query task 88 compares the total error value, $E_i$, with a predetermined error threshold, $E_{thres}$. When the total error value, $E_i$, is greater than the predetermined error threshold, $E_{thres}$, a task 90 is performed. Task 90 adds the spectrum to the preselected set of spectra thereby incrementing the value of M. In the preferred embodiment, error threshold, $E_{thres}$, defines the robustness of system 20. In other words, a greater number of separate spectra are added to the preselected set of spectra when $E_{thres}$ is a low value, as opposed to when $E_{thres}$ s is a high value. However, as the number of separate spectra in the preselected set of spectra increases, it becomes more difficult at receive end 34 (FIG. 1) to distinguish the separate spectra from one another. Accordingly, a high error threshold, $E_{thres}$, establishes a more robust or reliable system 20 for the transmission of signals representing digital data stream 22.

When the total error value, $E_i$, is not greater than the predetermined error threshold, $E_{thres}$, a task 92 is performed. Task 92 discards unique bit pattern 76 represented by the spectrum, $V_i$, and depicted in the frequency domain as the summation of the amplitudes at the N frequency bins. In other words, since the total error value, $E_i$, is less than the predetermined error threshold, $E_{thres}$, spectrum, $V_i$, cannot be consistently and reliably distinguished from all of the spectra, $V_j$, represented in the frequency domain by the summation of the amplitudes at the N frequency bins, in the preselected set of spectra.

Following either of tasks 90 and 92, a query task 94 is performed. Query task 94 determines if another unique bit pattern 76 on list 78 is to be processed. If another unique bit pattern 76 remains, program control loops back to task 74 to select the next unique bit pattern 76, and subprocess 72 is repeated.

When query task 94 determines that there are no more unique bit patterns 76 on list 78 to be processed, distinct waveform identification subprocess 72 exits. The outcome of subprocess 72 is a set of separate spectra, or separate signal-defining patterns. Each separate spectrum in the set of separate spectra has a large difference in spectral content relative to the rest of the set of separate spectra. Thus, each separate spectrum represents a distinct audio waveform which decoder 30 (FIG. 1) can readily distinguish from all other distinct audio waveforms represented by the set of separate spectra.

Referring back to FIG. 2, following distinct waveform identification subprocess 72, a task 96 is performed. Task 96 selects a potential data subset from a list of all possible potential data subsets. In the preferred embodiment, each of data subsets 66 (FIG. 1) of digital data stream 22 (FIG. 1) can be any one of the potential data subsets. Thus, every possible bit combination of data subsets 66 is expressed as a potential data subset in the list of potential data subsets. The potential data subsets can be expressed in terms of a fixed-size number of bits corresponding to the vocoder-defined frames (discussed above). Alternatively, the potential data subsets can be expressed as spectra in the frequency domain which are readily indexed using table search algorithms, for example.

Following selection of a potential data subset in task 96, a task 98 is performed. Task 98 assigns one distinct audio waveform generated in distinct waveform identification subprocess 72 to the selected potential data subset. The assignment may be made on an arbitrary basis.

In response to task 98, a task 100 stores the selected potential data subset as an entry in a memory location of table 40 (FIG. 1) in association with the separate spectrum representing the assigned distinct audio waveform. Alternatively, task 100 stores the signal-defining pattern for the assigned waveform at an address in table 40 specified by the selected data subset.

Following task 100, a query task 102 determines if there is another potential data subset for which a distinct audio waveform is to be assigned. When there is another potential data subset, program control loops back to task 96 to select the next potential data subset and perform the subsequent assignment of another distinct audio waveform. When query task 102 determines that there are no further potential data subsets, process 70 proceeds to a task 104.

Task 104 initializes table 52 (FIG. 1) in response to table 40 so that the digital bit stream transmitted over communication path 28 can be translated in order to produce synthesized digital data stream 56 (FIG. 1). Table 52 need not be identical to table 40. For example, table 40 may desirably be organized to perform table look-up operations using data subsets as an index, while table 52 may desirably be organized to perform an efficient search and match algorithm. However, the same informational content is represented. In other words, each of tables 40 and 52 associates potential data subsets with distinct audio waveforms to be assured of successful transmission and synthesis of digital data stream 22. In addition, initialization of table 52 need not be performed as a separate task. Rather, the table initialization activities of task 104 may be occurring concurrently with and independent of task 100.

Following task 104, initialization of tables 40 and 52 is complete, and process 70 exits. The product of process 70 is an initialized table 40 (FIG. 1) in frame generator 38 (FIG. 1) and corresponding table 52 (FIG. 1) in frame detector 46 (FIG. 1). Tables 40 and 52 are initialized such that vocoder compatible distinct audio waveforms representing any possible data subset 66 of digital data stream 22 (FIG. 1) can be transmitted from transmit end 32 (FIG. 1), through communication path 28 (FIG. 1), and can be reliably synthesized at receiving end (FIG. 1) to produce synthesized digital data stream 56. In other words, the vocoder compatible distinct audio waveforms are recognizable by vocoder encoder 26 for conversion, subsequent transmission through communication path 28, and audio waveform synthesis by vocoder decoder 30.

Figure 4:
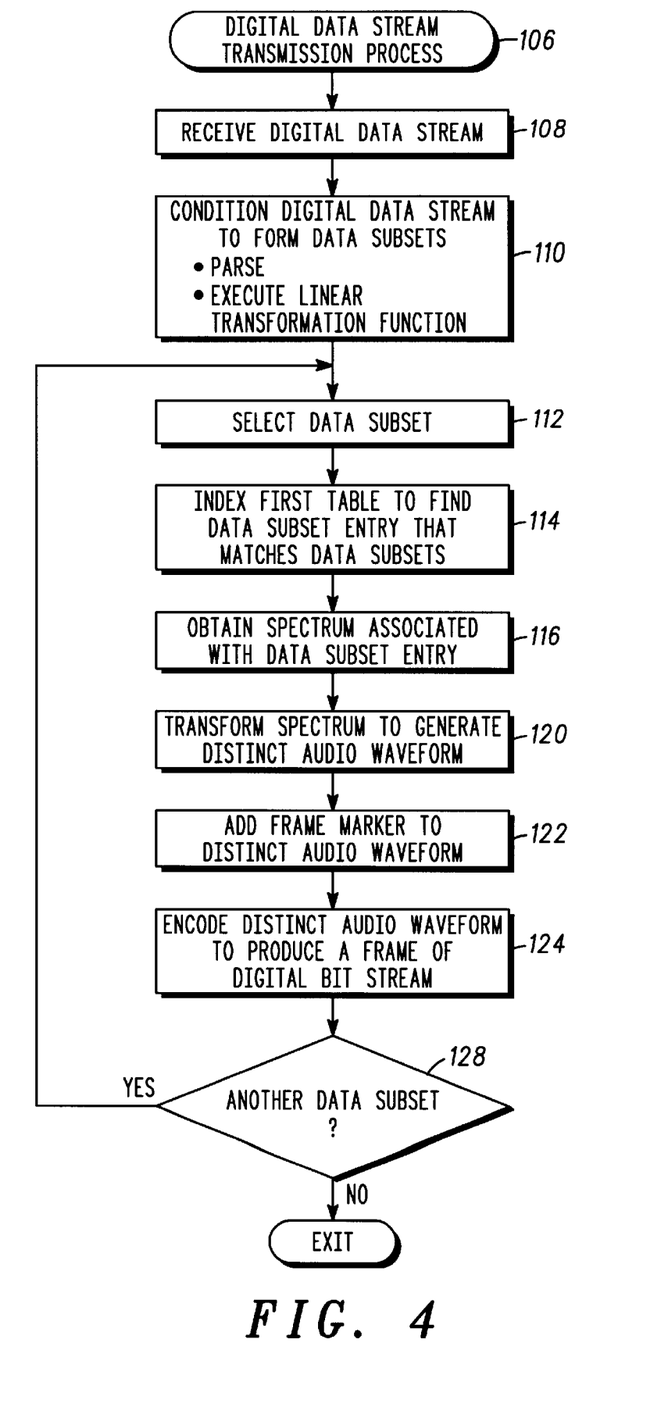
FIG. 4 shows a flowchart of a digital data stream transmission process in accordance with a preferred embodiment of the present invention.

FIG. 4 shows a flowchart of a digital data stream transmission process 106 in accordance with a preferred embodiment of the present invention. Process 106 is performed when digital data stream 22 (FIG. 1) is to be transmitted from transmit end 32 (FIG. 1) to receiving end 30 (FIG. 1) of system 20. Transmission process 106 begins with a task 108. Task 108 causes data conditioner 36 (FIG. 1) to receive digital data stream 22. Digital data stream 22 may be a computer file, a digitized video file, cipher text, FAX data, for example.

In response to receipt of digital data stream 22, data conditioner 36 initiates a task 110. Task 110 causes data conditioner 36 to parse, or break down, digital data stream 22 to produce data subsets 66 (FIG. 1) containing a quantity of bits (not shown) that is less than the number of vocoder-defined bits in a frame of vocoder data, but of a fixed length for each frame. In addition to, or alternatively, data conditioner 36 may execute a linear transformation function, such as an Inverse Fast Fourier Transform (IFFT), in order to form a time domain representation of data subsets 66 to compensate for the "frequency domain" transform discussed above in connection with task 84 (FIG. 3) and performed again at receive end 34 (FIG. 1), discussed below.

Transforming data subsets 66 using an IFFT serves to adjust a data rate of digital data stream 22 to match the data transmission rate of digital wireless voice service 22. In addition, the IFFT can be used to "spread out" data subsets 66 relative to the potential data subsets of table 40 (FIG. 1) so that the most different ones of distinct audio waveforms in table 40 are related to data subsets 66. Thus, a greater range of the set of distinct audio waveforms is used, which results in a more robust system so that synthesized data stream 56 (FIG. 1) representing digital data stream 22 can be more reliably produced.

Following task 110, a task 112 is performed. Task 112 causes frame generator 38 (FIG. 1) to select one of data subsets 66 produced by data conditioner 36 (FIG. 1). In the preferred embodiment, frame generator 38 selects data subsets 66 in consecutive order as produced by data conditioner 36.

In response to task 112, a task 114 causes frame generator 38 to index table 40 (FIG. 1) using data subset 66. Next, a task 116 is performed by frame generator 38. Task 116 causes frame generator 38 to obtain a separate signal-defining pattern, or spectrum, 118 (FIG. 1) associated with the data subset entry from table 40.

In response to receipt of separate signal-defining pattern 118 obtained in task 116, a task 120 causes waveform generator 42 (FIG. 1) of frame generator 38 to transform separate signal-defining pattern 118 to generate a distinct digitized audio waveform 122 (FIG. 1).

Following task 120, timing circuit 44 of frame generator 38 adds frame markers to distinct audio waveform 122 to form framed distinct audio waveform 68 (FIG. 1). The frame markers indicate the beginning and end of distinct audio waveform 68. The frame markers of distinct audio waveform 68 synchronize waveform 68 relative to temporal frames of the vocoder-defined frames. In other words, the start and stop markers of vocoder frames and the frame markers of distinct audio waveform 68 need not be synchronized. Rather, the duration of the frame defined by start and stop markers in framed distinct audio waveform 68 is synchronized to the duration of the vocoder-defined frame.

Following task 122, a task 124 causes vocoder encoder 26 (FIG. 1) to encode distinct audio waveform 68 to produce a frame of a vocoder digital bit stream 126 (FIG. 1) to be subsequently transmitted through communication path 28 of digital wireless voice service 24. As discussed previously, encoder 26 employs a lossy compression technique to compress distinct audio waveform 68 into a frame of vocoder digital bit stream 126. However, the transformation and expansion activities of frame generator 38 cause distinct audio waveform 68 representing data subset 66 to be expressed in a data size greater than data subset 66. Accordingly, the compression technique employed by encoder 26 causes data to be lost from distinct audio waveform 68 that is not part of the informational content of framed distinct audio waveform 68 so that digital data stream 22 can be successfully synthesized upon receipt of vocoder digital bit stream 126.

Following task 124, a query task 128 determines if there is another data subset 66 available for receipt by frame generator 38. When query task 128 determines that there is another data subset 66, program control loops back to task 112 for subsequent selection and transmission of the next data subset 66. While FIG. illustrate process 106 as being entirely sequential for convenience, those skilled in the art will appreciate that different tasks of process 106 may simultaneously process different blocks of data in a pipelined fashion. Process 106 continues in this loop until query task 128 determines that there is not another data subset 66. In other words, until transmission of digital data stream 22 is complete. Following completion of transmission of digital data stream 22, process 106 exits.

Figure 5:
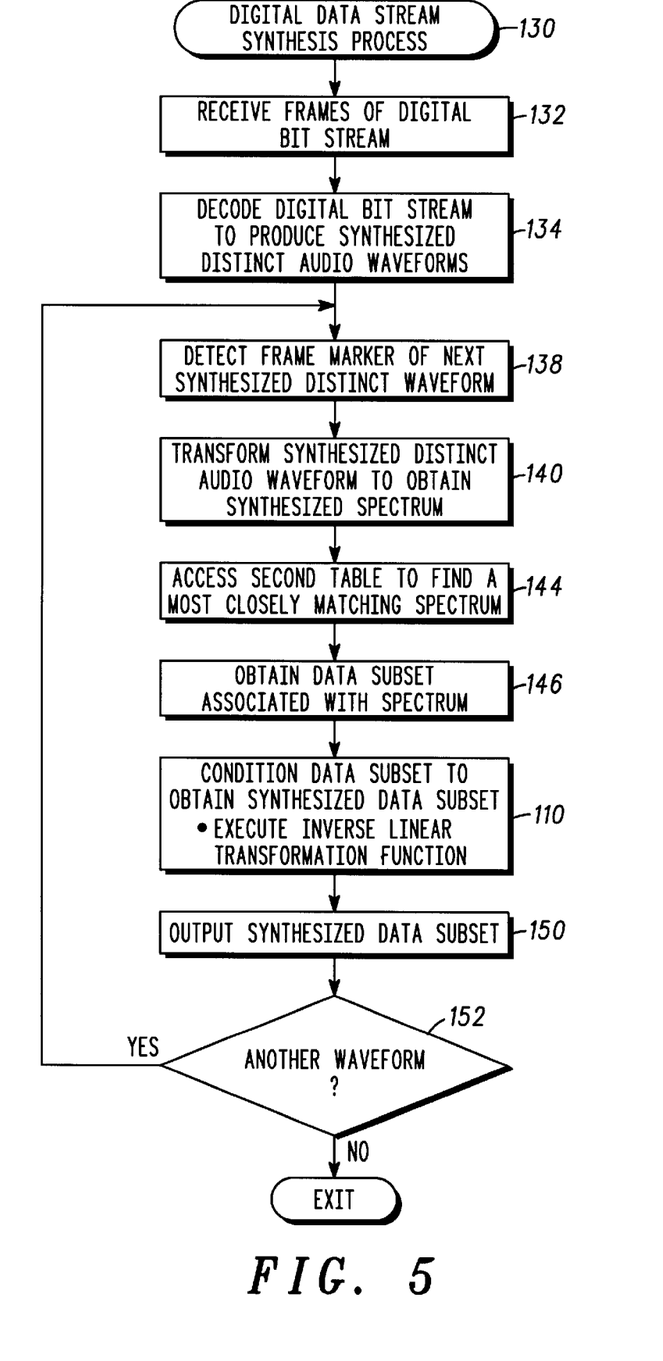
FIG. 5 shows a flowchart of a digital data stream synthesis process in accordance with a preferred embodiment of the present invention.

FIG. 5 shows a flowchart of a digital data stream synthesis process 130 in accordance with a preferred embodiment of the present invention. Process 130 is performed at receiving end 34 (FIG. 1) of system 20. Process 130 begins with a task 132. Task 132 causes vocoder decoder 30 (FIG. 1) to receive consecutive frames of vocoder digital bit stream 126 from communication path 28 (FIG. 1).

In response to received frames of vocoder digital bit stream 126 in task 132, a task 134 is performed by vocoder decoder 30. Task 134 causes decoder 30 to convert vocoder digital bit stream 126 into a synthesized distinct audio waveform 136 (FIG. 1). Synthesized distinct audio waveform 136 is a synthesized or re-created representation of distinct audio waveform 68. Synthesized distinct audio waveform is decompressed or expanded relative to vocoder digital bit stream 126. Decoder 30 does not precisely reconstitute distinct audio waveform 68. Rather, decoder 30 produces synthesized distinct audio waveform 136 to closely resemble distinct audio waveform 68.

In response to task 134, a task 138 causes timing circuit 48 (FIG. 1) of frame detector 46 (FIG. 1) to detect the frame markers defining the beginning and end of synthesized distinct audio waveform 136.

Following task 138, a task 140 causes spectrum generator 50 (FIG. 1) of frame detector 46 to transform synthesized distinct audio waveform 136 defined by the frame markers to obtain a synthesized spectrum 142 (FIG. 1). Synthesized spectrum 142 is a frequency domain signal-defining pattern representative of synthesized distinct audio waveform 136.

After obtaining synthesized spectrum 142 in task 140, a task 144 is performed. Task 144 causes frame detector 46 to access second table 52 (FIG. 1) to find the separate spectrum entry in table 52 that most closely matches synthesized spectrum 142. Frame detector 46 may employ Euclidean Distance Measurements or other spectrum matching algorithms which look for similarities, such as particular harmonics, amplitudes at various frequency bins, and so forth, between spectra in table 52 and synthesized spectrum 142.

When a most closely matching separate spectrum is selected in task 144, process 130 proceeds to a task 146.

Task 146 causes frame detector 46 to obtain from table 52 a potential data subset associated with the selected most closely matching separate spectrum. Since table 52 was initialized in response to the initialization of table 40 during initialization process 70, the potential data subset from table 52 corresponds to the potential data subset from table 40.

Following task 146, a task 148 causes data assembler 54 (FIG. 1) to condition potential data subset to obtain a synthesized data subset. Conditioning may include executing an inverse linear transformation function, such as a Fast Fourier Transform, to reverse the IFFT performed by data conditioner 36 during conditioning task 110 (FIG. 4) of transmission process 106 (FIG. 4). For example, the inverse linear transformation function could serve to adjust the data rate of synthesized digital data stream 56 to be substantially equal to the data rate of digital data stream 22.

In addition to obtaining the synthesized data subset in task 148, a task 150 causes the data assembler 54 to output the synthesized data subsets in consecutive order to produce synthesized digital data stream 56.

Following task 150, a query task 152 determines if decoder 30 (FIG. 1) is producing another synthesized distinct audio waveform 136. When another synthesized distinct audio waveform 136 is available, program control loops back to task 138 for subsequent detection of the frame markers to obtain the next synthesized data subset. Process 130 remains in this loop until no further synthesized distinct audio waveforms 136 are detected, signifying the end of receipt of vocoder digital bit stream 126 (FIG. 1) in response to digital data stream 22 (FIG. 1). When another synthesized distinct audio waveform 136 is not available, process 130 is exited.

In summary, a system and method are provided for transmitting a digital data stream using a lossy compression service having a communication path through which compressed signals propagate. The system and method uses the vocoder system of a lossy compression service to provide data and FAX transmission services. Thus the system and method allows service subscribers to utilize a lossy compression service such as a standard digital wireless voice service to obtain data or FAX services without changes to the infrastructure of the lossy compression service. Data and FAX services are accomplished by providing a system which interfaces to an audio input of a compatible vocoder system to send data and FAX transmissions. In addition, by using vocoder-compatible distinct digital audio waveforms to represent subsets of the digital data stream, the data rate of the digital data stream is not reduced, thus accomplishing substantially real-time data transmission.

Although the preferred embodiments of the invention have been illustrated and described in detail, it will be readily apparent to those skilled in the art that various modifications may be made therein without departing from the spirit of the invention or from the scope of the appended claims. For example, the tables described may be configured in any of a number of ways, yet still associate data subsets of digital data stream with vocoder-compatible distinct audio waveforms. Moreover, when either or both of vocoder encoder 26 and decoder 30 are omitted, system 20 may still be used to communicate data by altering the contents of tables 40 and 52. When only one of vocoder encoder 26 and decoder 30 are used, tables 40 and 52 will be configured to hold different data. In addition, a variety of search algorithms may be employed to speed up processing time when accessing either of the tables. Furthermore, other transformation operations may be employed to condition the data subsets and distinct audio waveforms.

What is claimed is:

1. A system for transmitting a digital data stream using a lossy compression service having a communication path through which compressed signals propagate, said system comprising:
   a data conditioner configured to receive said digital data stream, said data conditioner conditioning said digital data stream to produce a plurality of data subsets;
   a frame generator in communication with said data conditioner for expanding each of said data subsets to generate distinct signal sets, said distinct signal sets being expressed in a data size greater than said data subsets to compensate for lossy compression caused by said lossy compression service; and
   a transmitter in communication with said frame generator for transmitting digitized ones of said distinct signal sets in frames of a digital bit stream over said communication path.

2. A system as claimed in claim 1 wherein said frame generator comprises a table for associating data subset entries with said distinct signal sets, said data subset entries being indexed in response to each of said data subsets to obtain said distinct signal sets.

3. A system as claimed in claim 2 wherein said table comprises:
   a plurality of memory locations, each of said memory locations being configured to store one of said data subset entries representative of one of said data subsets; and
   a plurality of separate signal-defining patterns, one each of said separate signal-defining patterns being stored in association with one each of said data subset entries, wherein one each of said separate signal-defining patterns represents one each of said distinct signal sets.

4. A system as claimed in claim 3 wherein said frame generator further comprises a waveform generator for receiving said separate signal-defining patterns, said waveform generator being configured to generate said distinct signal sets in response to receipt of said separate signal-defining patterns from said table.

5. A system as claimed in claim 4 wherein said lossy compression service is a digital voice service, said transmitter is a vocoder encoder system, said compressed signals are vocoder signals which propagate over said communication path from said vocoder encoder system to a vocoder decoder system of said digital voice service, said distinct signal sets are distinct digitized audio waveforms, each of said separate signal-defining patterns describes a separate audio spectrum for each of said distinct digitized audio waveforms, and said table is configured to associate one each of said separate spectra with one each of said data subset entries.

6. A system as claimed in claim 5 wherein:
   said data conditioner is configured to condition said digital data stream to produce said plurality of data subsets each having a bit number compatible with a predetermined number of bits in each of said frames of said digital bit stream;
   said waveform generator is configured to generate said distinct audio waveforms in response to receipt of said ones of said separate spectra from said table; and
   said vocoder encoder is configured to compress said distinct audio waveforms to said bit number for transmission in said frames of said digital bit stream.

7. A system as claimed in claim 1 further comprising:
   a receiver for receiving said digital bit stream from said communication path, said receiver generating synthesized ones of said distinct signal sets;
   a frame detector in communication with said receiver for transforming said synthesized distinct signal sets to form synthesized signal-defining patterns, each of said synthesized signal-defining patterns being associated with synthesized ones of said plurality of data subsets; and
   a data assembler in communication with said frame detector and configured to receive said synthesized ones of said data subsets in response to said synthesized signal-defining patterns, said data assembler assembling said synthesized ones of said data subsets to produce a synthesized digital data stream representative of said digital data stream.

8. A system as claimed in claim 7 wherein said frame detector comprises a table for storing said separate signal-defining patterns in memory locations of said table relative to said synthesized ones of said data subsets, and said frame detector is configured to select ones of said separate signal-defining patterns that most closely match said synthesized signal-defining patterns in order to obtain said synthesized data subsets.

9. A system as claimed in claim 7 wherein:
   said frame generator is configured to add frame markers to said generated distinct signal sets to synchronize said generated distinct signal sets relative to temporal frames; and
   said frame detector is configured to detect said frame markers following transmission of said digital bit stream over said communication path.

10. A system as claimed in claim 7 wherein said frame detector comprises a spectrum generator for generating said synthesized ones of said separate signal-defining patterns in response to said synthesized distinct signal sets.

11. A method for transmitting a digital data stream using a lossy compression service having a communication path through which compressed signals propagate, said method comprising the steps of:
    relating, in a first table, a distinct signal set to each of a first plurality of data subsets;
    conditioning said digital data stream to produce a second plurality of data subsets, each of said second plurality of data subsets being any one of said first plurality of data subsets;
    indexing ones of said first plurality of data subsets in said first table in response to each of said second plurality of data subsets to obtain related ones of said distinct signal sets;
    transmitting a digital bit stream representative of said related distinct signal sets over said communication path of said lossy compression service;
    accessing a second table in response to received frames of said digital bit stream to synthesize said second plurality of data subsets of said digital data stream; and
    assembling said synthesized second plurality of data subsets to synthesize said digital data stream.

12. A method as claimed in claim 11 wherein said relating step comprises the step of expanding each of said first plurality of data subsets to generate each of said distinct signal sets such that said distinct signal sets are expressed in a size greater than said data subsets in order to compensate for lossy compression caused by said lossy compression service.

13. A method as claimed in claim 11 wherein said relating step occurs in a table initialization process which is performed prior to said conditioning step.

14. A method as claimed in claim 11 wherein each data subset of said first plurality of data subsets is a fixed-size bit stream exhibiting a unique bit pattern, said first plurality of data subsets is configured to include every combination of said unique bit patterns, and said relating step comprises the steps of:
  identifying a plurality of distinct signal sets compatible with transmission through said communication path;
  assigning one each of said plurality of distinct signal sets to one each of said first plurality of data subsets; and
  associating each of said first plurality of data subsets with said assigned ones of said distinct signal sets in said first table.

15. A method as claimed in claim 14 wherein said lossy compression service is configured to process frames of lossy-compressed digital bit patterns, and said identifying step comprises the steps of:
  decoding said frames of lossy-compressed digital bit patterns to produce signal sets;
  transforming said signal sets to obtain a separate signal-defining pattern for each of said signal sets;
  measuring a difference between each of said separate signal-defining patterns and a preselected set of separate signal-defining patterns to obtain an error value for each of said separate signal-defining patterns;
  distinguishing ones of said separate signal-defining patterns in which said measured total error values are greater than a predetermined error threshold; and
  adding said distinguished ones of said separate signal-defining patterns to said preselected set of separate signal-defining patterns, said preselected set of separate signal-defining patterns representing said plurality of distinct signal sets.

16. A method as claimed in claim 15 wherein said measuring step includes the step of calculating a Euclidean distance measure for each of said separate signal-defining patterns to produce said total error value.

17. A method as claimed in claim 15 wherein said lossy compression service is a digital voice service, said compressed signals are vocoder signals which propagate over said communication path from a vocoder encoder to a vocoder decoder of said digital voice service, said distinct signal sets are distinct digitized audio waveforms compatible with said digital voice service, and each of said separate signal-defining patterns is a separate spectrum.

18. A method as claimed in claim 11 wherein said digital bit stream includes frames of lossy-compressed digital bit patterns, each of said frames having a predetermined number of bits, and said conditioning step comprises the step of parsing said digital data stream into data subsets selected from said second plurality of data subsets, each of said data subsets containing a quantity of bits less than said predetermined number of bits in each of said frames.

19. A method as claimed in claim 11 wherein:
  said conditioning step comprises the step of executing a linear transformation function on said digital data stream to form said second plurality of data subsets prior to said indexing step; and
  said assembling step comprises the step of executing an inverse linear transformation function on said synthesized second plurality of data subsets to form said synthesized digital data stream.

20. A method as claimed in claim 11 wherein:
  said indexing step includes the step of obtaining separate signal-defining patterns of said related ones of said distinct signal sets; and
  said method further comprises the step of transforming said separate signal-defining patterns to generate said distinct signal sets prior to said transmitting step.

21. A method as claimed in claim 11 wherein said lossy compression service converts each of said distinct signal sets into frames of a predetermined number of bits, and said method further comprises the step of adding a frame marker to each of said distinct signal sets prior to said transmitting step.

22. A method as claimed in claim 21 further comprising the steps of:
  receiving said frames of said digital bit stream at a receiver of said lossy compression service;
  converting said digital bit streams into synthesized ones of said distinct signal sets;
  detecting said frame marker; and
  transforming said synthesized distinct signal sets in response to said detected frame marker prior to said accessing step to obtain synthesized separate signal-defining patterns of said synthesized distinct signal sets.

23. A method as claimed in claim 22 wherein said distinct signal sets are represented as separate signal-defining patterns in said second table, and said accessing step comprises the steps of:
  selecting one of said separate signal-defining patterns from said second table that most closely matches one of said synthesized separate signal-defining patterns; and
  obtaining one of said data subsets from said first plurality of data subsets related to said selected separate signal-defining pattern.

24. A method for transmitting a digital data stream using a digital wireless service having a communication path through which vocoder signals propagate, said method comprising the steps of:
  relating, in a first table, a distinct audio waveform to each of a first plurality of data subsets;
  conditioning said digital data stream to produce a second plurality of data subsets, each of said second plurality of data subsets being any one of said first plurality of data subsets;
  indexing ones of said first plurality of data subsets in said first table in response to each of said second plurality of data subsets to obtain related ones of said distinct audio waveforms;
  generating said distinct audio waveforms in response to said indexing step;
  adding a frame marker to each of said generated distinct audio waveforms;
  encoding, at an encoder system of said digital wireless service, each of said distinct audio waveforms to obtain frames of a vocoder digital bit stream;
  transmitting said vocoder digital bit stream representative of said related distinct audio waveforms over said communication path of said digital wireless service;
  decoding, at a decoder system of said digital wireless service, said vocoder digital bit stream to generate synthesized distinct audio waveforms;
  detecting said frame markers to differentiate each of said synthesized distinct waveforms;
  transforming each of said synthesized distinct audio waveforms to produce synthesized spectra;
  accessing a second table to select a most closely matching spectrum for each of said synthesized spectra to obtain related ones of said second plurality of data subsets; and
  assembling said second plurality of data subsets to synthesize said digital data stream.

25. A method as claimed in claim 24 wherein the digital data stream comprises video data.

26. In a system for transmitting a digital data stream using a digital lossy compression service, a method of training a table to relate data subsets of said digital data stream with distinct signal sets, said method comprising the steps of:

processing each of a plurality of unique bit patterns to generate signal sets;

transforming each of said signal sets to obtain a separate signal-defining pattern for each of said signal sets;

measuring a total error value between each of said separate signal-defining patterns and a preselected set of separate signal-defining patterns by performing a Euclidean distance measure operation for each of said separate signal-defining patterns;

distinguishing ones of said separate signal-defining patterns in which said measured total error values are greater than a predetermined error threshold;

adding said distinguished ones of said separate signal-defining patterns to said preselected set of separate signal-defining patterns, said preselected set of separate signal-defining patterns representing said plurality of distinct signal sets;

assigning one each of said plurality of distinct signal sets to one each of said first plurality of data subsets; and associating each of said first plurality of data subsets with said assigned ones of said distinct signal sets in said first table.

27. A method as claimed in claim 26 wherein the digital data stream comprises video data.

* * * * *